United States Patent [19]

Sasaki

[11] Patent Number: 5,430,648
[45] Date of Patent: Jul. 4, 1995

[54] VEHICULAR SUSPENSION SYSTEM

[75] Inventor: Mitsuo Sasaki, Atsugi, Japan

[73] Assignee: Unisia Jecs Corporation, Japan

[21] Appl. No.: 25,789

[22] Filed: Mar. 3, 1993

[30] Foreign Application Priority Data

Mar. 3, 1992 [JP] Japan .................................. 4-045269

[51] Int. Cl.6 ..................... B60G 17/015; B60G 17/00
[52] U.S. Cl. ................................. 364/424.05; 280/707;
280/840; 180/41
[58] Field of Search ..................... 364/424.05; 180/41,
180/209; 280/707, 714, 6.12, 840, 6.1, 6.11

[56] References Cited

U.S. PATENT DOCUMENTS

| 4,526,401 | 7/1985 | Kakizaki et al. | 280/707 |
|---|---|---|---|
| 4,696,489 | 9/1987 | Fujishiro et al. | 280/707 |
| 4,747,615 | 5/1988 | Yamamoto | 280/707 |
| 4,903,209 | 2/1990 | Kaneko | 364/424.05 |
| 4,921,272 | 5/1990 | Ivers | 280/707 |
| 4,970,645 | 11/1990 | Adachi et al. | 364/424.05 |
| 4,975,849 | 12/1990 | Ema | 364/424.05 |
| 5,047,938 | 9/1991 | Yokote et al. | 364/424.05 |
| 5,058,017 | 10/1991 | Adachi et al. | 364/424.05 |
| 5,074,569 | 12/1991 | Kawabata | 280/707 |
| 5,162,996 | 11/1992 | Matsumoto et al. | 364/424.05 |
| 5,269,558 | 12/1993 | Yoshioka et al. | 280/707 |

FOREIGN PATENT DOCUMENTS

| 0186908 | 7/1986 | European Pat. Off. . |
|---|---|---|
| 0231025 | 8/1987 | European Pat. Off. . |
| 0385723 | 9/1990 | European Pat. Off. . |
| 3923929 | 1/1990 | Germany . |
| 62-194919 | 8/1987 | Japan . |
| 63-017105 | 1/1988 | Japan . |
| 6440712 | 3/1989 | Japan . |
| 1208212 | 8/1989 | Japan . |
| 3213737 | 9/1991 | Japan . |
| 4306114 | 10/1992 | Japan . |
| 2070289 | 9/1981 | United Kingdom . |
| WO9110077 | 7/1991 | WIPO . |

Primary Examiner—Kevin J. Teska
Assistant Examiner—Tan Nguyen
Attorney, Agent, or Firm—Ronald P. Kananen

[57] ABSTRACT

A vehicular suspension system comprises a hydraulic damper including a valve element having a plurality of positions and a pulse motor drivingly coupled with the valve element. A control unit is operatively coupled with the pulse motor. In order to avoid loss of synchronism of the pulse motor, the pulse motor is held stationary for a predetermined period of time after it has been determined that the pulse motor must reverse its direction of motion to reach a target position.

5 Claims, 12 Drawing Sheets

VEHICULAR SUSPENSION SYSTEM

BACKGROUND OF THE INVENTION

The present invention relates to a vehicular suspension system and a method of controlling a vehicular suspension system.

A vehicular suspension system is known which comprises a plurality of shock absorbers, each including a hydraulic damper. The hydraulic damper includes a valve element having a plurality of positions and an actuator in the form of a pulse or stepper motor drivingly coupled with the valve element. A control unit is operatively coupled with each of the pulse motors. Each of the pulse motors is subject to the control unit such that if a target position is subject to a change, the pulse motor turns concurrently with the occurence of this change to approach or reach the new target position. Since turning of the pulse motor and the subsequent turning of the valve element is resisted by flow of hydraulic fluid passing through the hydraulic damper, occurrence of vibration is unavoidable. However, situations where resonance is induced by the vibration. If the resonance inducing vibration takes place, it is difficult to find the appropriate timing to drive the pulse motor. Thus, the loss of synchronism of the pulse motor is unavoidable in the known system.

Accordingly, an object of the present invention is to improve a vehicular suspension system such that the actuator for the valve element of the adjustable hydraulic damper moves smoothly by avoiding the occurrence of loss of synchronism of the actuator.

SUMMARY OF THE INVENTION

According to one aspect of the present invention, there is provided a vehicular suspension system comprising:

a hydraulic damper including a valve element having a plurality of positions and an actuator drivingly coupled with the valve element; and a control unit operatively coupled with the actuator, wherein the actuator is held stationary for a predetermined period of time after it has been determined that the actuator must reverse its direction of motion to reach a target position.

According to another aspect of the present invention, there is provided a method of controlling a vehicular suspension system comprising:

a hydraulic damper including a valve element having a plurality of positions and an actuator drivingly coupled with the valve element; and a control unit operatively coupled with the actuator, wherein the actuator is held stationary for a predetermined period of time after it has been determined that the actuator must reverse its direction of motion to reach a target position.

DETAILED DESCRIPTION OF THE INVENTION

Figure 1:
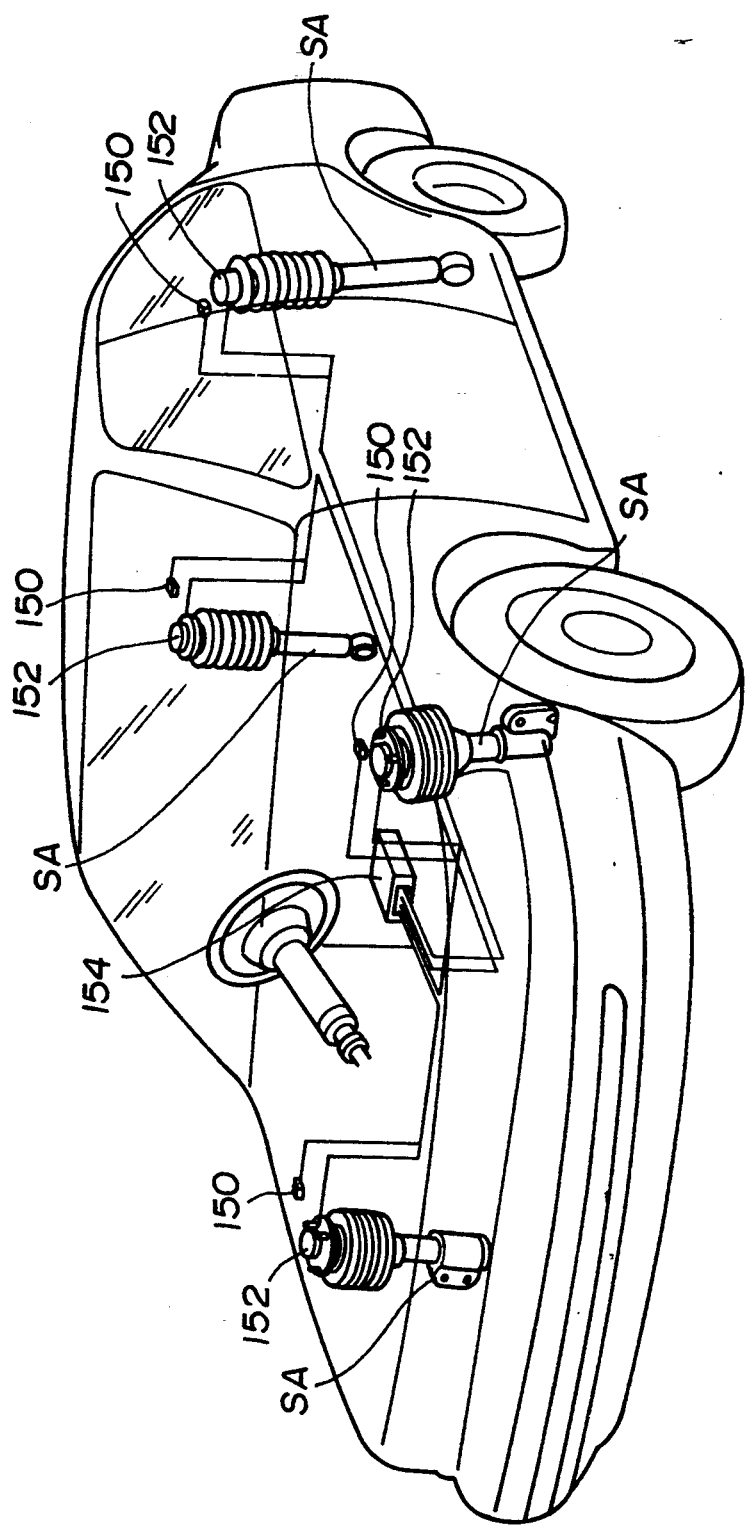
FIG. 1 is a schematic representation of a vehicular suspension system installed in an automobile.

Referring to FIG. 1, there are illustrated four shock absorbers SA installed in a conventional manner between a vehicle body and the corresponding axles which are operatively connected with road wheels. Illustrated adjacent the shock absorbers SA are G sensors 150 which detects vertical acceleration of the vehicle body at portions adjacent the shock absorbers SA, respectively. Sensor outputs of the G sensors 150 are fed to a control unit 154 mounted within a passenger compartment of the vehicle. Mounted on the shock absorbers are actuators 152 which are subject to the control unit 154. Each of the actuators 152 is in the form of a pulse or stepper motor.

Figure 2:
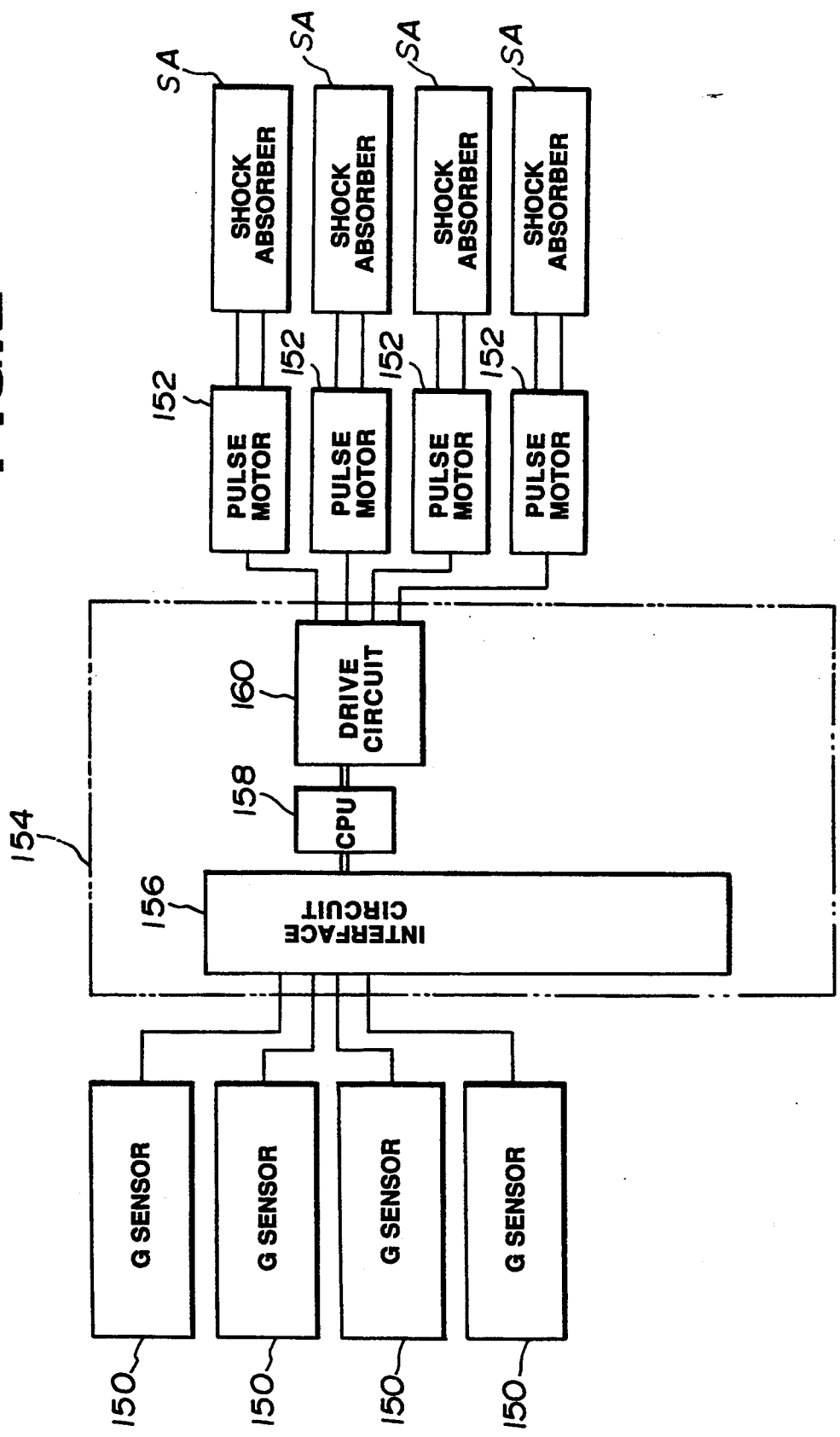
FIG. 2 is a control block diagram.

Referring to FIG. 2, the control unit 154 is operatively coupled with the G sensors 150. Specifically, the control unit 154 includes an interface circuit 156, a central processing unit (CPU) 158, and a drive circuit 130. Via the interface circuit 156, the sensor outputs of the G sensors 150 are read at regular intervals and the read data are processed via integration to give vertical speeds. Based on the speeds, target positions which the pulse motors 152 should assume are determined. Then, direction of motion in which each of the pulse motor 152 should rotate to assume the target position assigned thereto is determined. The CPU 158 gives instructions to the drive circuit 160. Based on the instructions, the drive circuit 160 controls the pulse motors 152.

Figure 3:
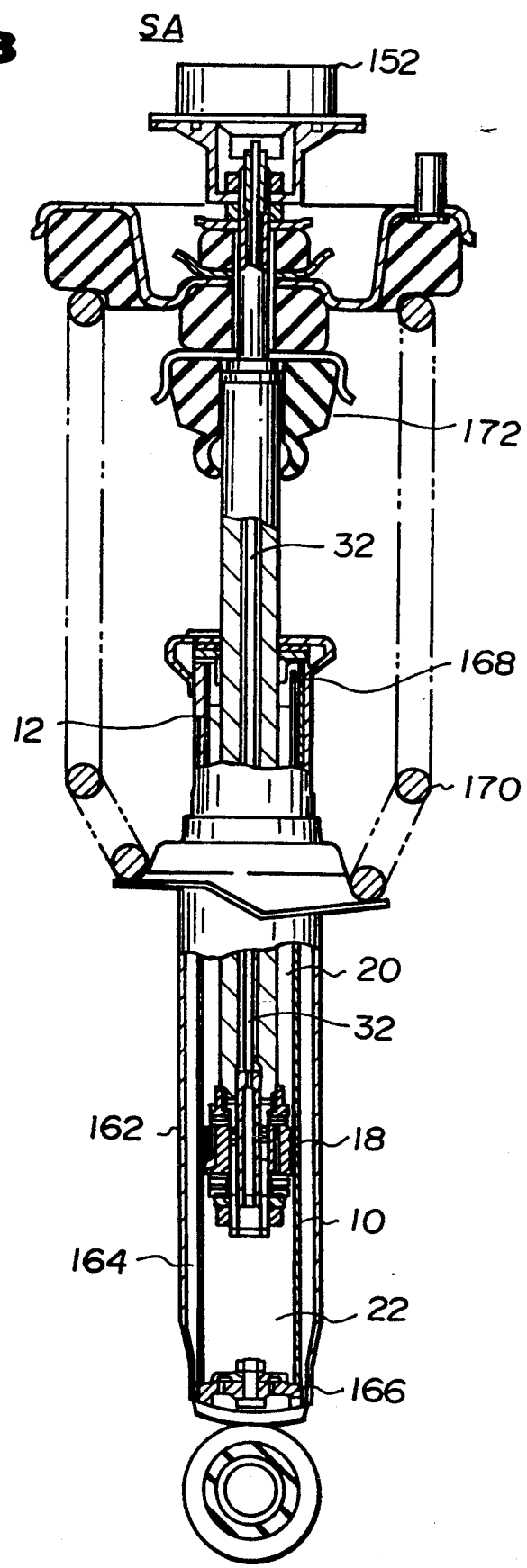
FIG. 3 is an illustration of a shock absorber partly sectioned.

Referring to FIG. 3, each shock absorber SA comprises a cylinder 10, a piston 18 defining on one side an upper chamber 20 and on the opposite side a lower chamber 22 within the cylinder 10, an outer casing 162 surrounding the cylinder 10 to define therearound a reservoir 164, a base 166 partly defining the lower chamber 22, a rod guide 168 slidably guiding a rod 12, a suspension spring 170 and a stop rubber 172.

Figure 4:
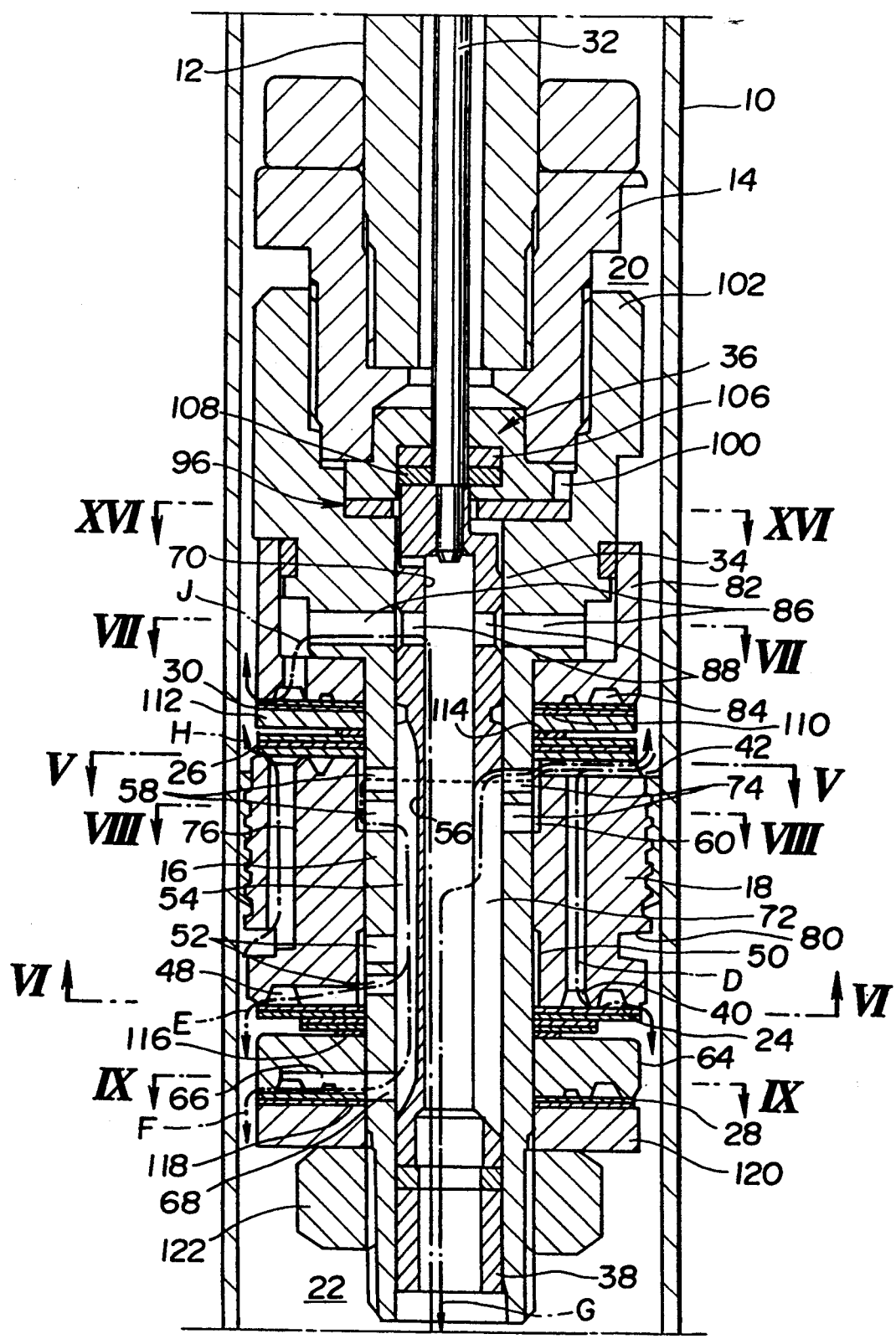
FIG. 4 is a fragmentary diagrammatic view of a hydraulic damper of the shock absorber shown in FIG. 3, this view representing sections taken through the line IV—IV of FIGS. 5, 6 and 16.

FIG. 4 illustrates in section an adjustable hydraulic damper which forms a part of the shock absorber SA shown in FIG. 3.

Referring to FIG. 4, the adjustable hydraulic damper generally comprises the cylinder 10, a piston rod assembly including the piston rod 12 hollowed, a hollow rebound stopper 14 threadadly secured on the end of the piston rod 12 and a hollow rod 16 threadedly secured on the rebound stopper 14, and a damping piston assembly secured on the hollow rod 16. The piston assembly includes a piston 18. The piston 18 divides the interior of the cylinder 10 into upper and lower chambers 20 and 22 containing hydraulic damping fluid. The piston 18 is fitted with an extension phase damping valve 24, a contraction phase damping valve 26, an extension phase one-way valve 28 and a contraction phase one-way valve 30. A control rod assembly includes a rod 32 and a hollow control rod 34 secured on the end of the rod 32. The rod 32 is rotatably mounted within the hollow interior of the piston rod 12 and has its lower end portion rotatably supported by a bushing 36 disposed between the rebound stopper 14 and the hollow rod 16. As seen in FIG. 3, the upper end of the rod 32 is drivingly coupled with the pulse motor 152. The hollow control rod 34 which serves as a valve element is rotatably mounted within the cylindrical bore of the hollow rod 16. The lower end of the hollow control rod 34 has a bushing 38.

Figure 5:
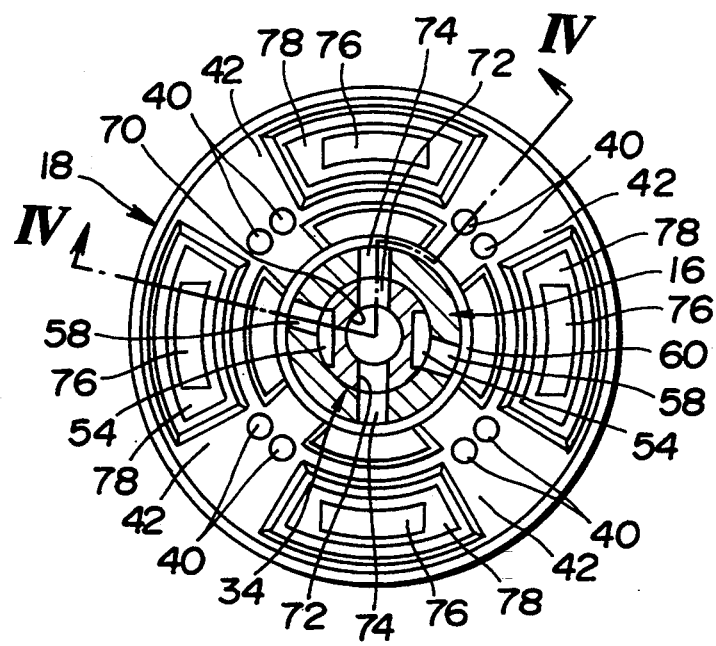
FIG. 5 is a section taken through the line V—V of FIG. 4.
Figure 6:
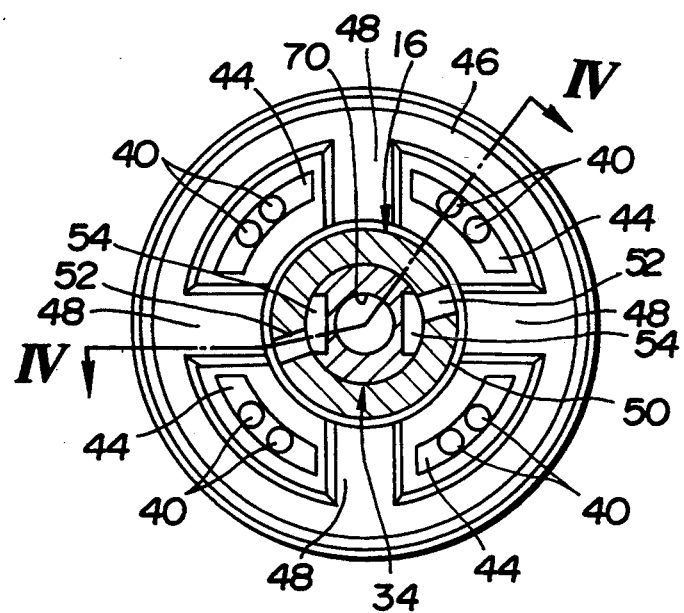
FIG. 6 is a section taken through the line VI—VI of FIG. 4.

The piston 18 has four pairs of extension phase bores 40 and the extension phase damping valve 24 for damping in the extension phase, the valve being in the form of a stack of disc springs. As best seen in FIGS. 5 and 6, each of the four pairs of extension phase bores 40 have upper ends opening to one of four radial passages 42 which are provided in the upper axial end of the piston 18 and adjacent the contraction phase damping valve 26. The lower ends of each of the four pairs of extension phase bores 40 open to one of four equi-angularly distant recesses 44 which are provided in the lower axial end of the piston 18 and adjacent the extension phase damping valve 24. An annular recess 44 is provided in the lower axial end of the piston 18 and adjacent the extension phase damping valve 24 in such a manner as to surround the four equi-angularly distant recesses 44. The four equi-angularly distant recesses 44 communicate with the upper chamber 20 through the extension phase bores 40 and the radial passages 42. The annular recess 46 communicates with the upper chamber 20 through radial recesses 48, an annular passage 50, discharge bores 52, axial passages 54 formed between the cylindrical interior of the hollow rod 16 and grooves 56, inlet bores 58, an annular passage 60 and the radial passages 42. A valve body 64 for the extension phase one-way valve 28 is secured on the hollow rod 16. In the lower axial end of this valve body 64, radial recesses 66 are provided adjacent the extension phase one-way valve 28. These radial recesses 66 communicate with the upper chamber 20 through discharge bores 68, the axial passages 54, the inlet bores 58, the annular passage 60 and the radial passages 42. The hollow control rod 34 has a central bore 70 opening to the lower chamber 22. The central bore 70 communicates with the upper chamber 20 through axial slots 72, bypass bores 74, the annular passage 60 and the radial passages 42.

For extension phase, there are four passage ways open when the hollow control rod 34 assumes the neutral position as shown in FIGS. 5, 6, 10, 11 and 12. Namely, these four passage ways are;

A first extension phase passage way D which allows a flow of damping fluid through the extension phase bores 40 to the four equi-angularly distant recesses 44 and into the lower chamber 22 deflecting open the extension phase damping valve 24;

A second extension phase passage way E which allows a flow of damping fluid to the annular recess 46 through the inlet bores 58, the axial passages 54 and the discharge bores 52 and into the lower chamber 22 deflecting open the extension phase damping valve 24;

A third extension phase one-way passage way F which allows a flow of damping fluid to the radial recesses 66 through the inlet bores 58, the axial passages 54 and the discharge bores 68 and into the lower chamber 22 deflecting open the one-way valve 28; and A fourth or bypass way G which allows a flow of damping fluid into the lower chamber 22 through the bypass bores 74, the axial slots 72 and the central bores 70.

For the contraction phase, the piston 18 has four contraction phase bores 76 and the contraction phase damping valve 26 is also in the form of a stack of disc springs. As best seen in FIG. 2, each of the four contraction phase bores 76 has an upper end opening to one of four equi-angularly distant recesses 78 which are provided in the upper axial end of the piston and adjacent the contraction phase damping valve 26. The contraction phase bores 76 have lower ends communicating with a circumferential inlet groove 80 opening to the lower chamber 22. A valve body 82 for the contraction phase one-way valve 30 is secured on the hollow rod 16. In the lower axial end of this valve body 82, an annular recess 84 is provided adjacent the contraction phase one-way valve 30. This annular recess 84 communicates with the lower chamber 22 through transverse bores 86, discharge bores 88 and the central bore 70.

For the contraction phase, there are three passage ways open when the hollow control rod 34 assumes the neutral position as shown in FIGS. 5, 6, 10, 11 and 12. Namely, the three passage ways are;

A first contraction phase passage way H which allows a flow of damping fluid through the contraction phase bores 78 to the equi-angularly distant recesses 78 and into the upper chamber 20 deflecting open the contraction phase damping valve 26;

A second contraction phase one-way passage way J which allows a flow of damping fluid through the central bore 70, the discharge bores 88, the transverse bores 86 to the annular recess 84 and into the upper chamber 20 deflecting open the contraction phase one-way valve 30; and The before-mentioned bypass passage way G.

Figure 7:
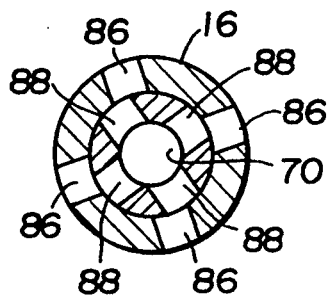
FIG. 7 is a diagrammatic section taken through the line VII—VII of FIG. 4, showing a control rod assembly in a first angularly displaced position.
Figure 8:
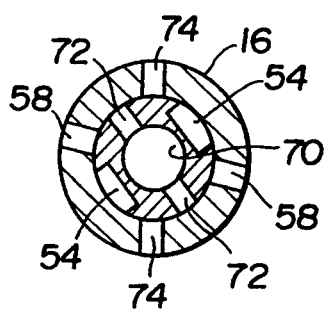
FIG. 8 is a diagrammatic section taken through the line VIII—VIII of FIG. 4, showing the control rod assembly in the first angularly displaced position.
Figure 9:
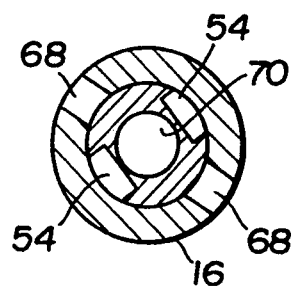
FIG. 9 is a diagrammatic section taken through the line IX—IX of FIG. 4, showing the control rod assembly in the first angularly displaced position.
Figure 10:
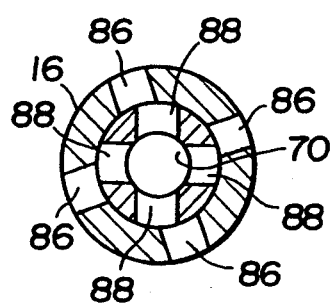
FIGS. 10, 11 and 12 are similar views to FIGS. 7, 8 and 9, but showing the control rod assembly in a neutral position.
Figure 11:
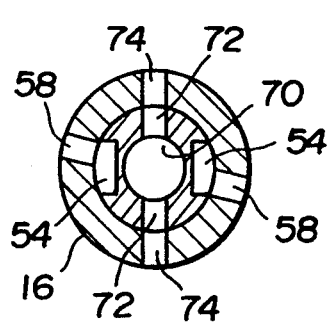
Figure 12:
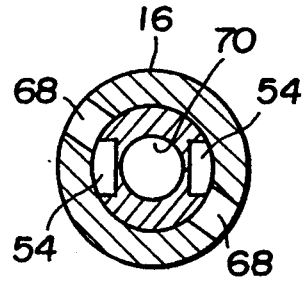
Figure 18:
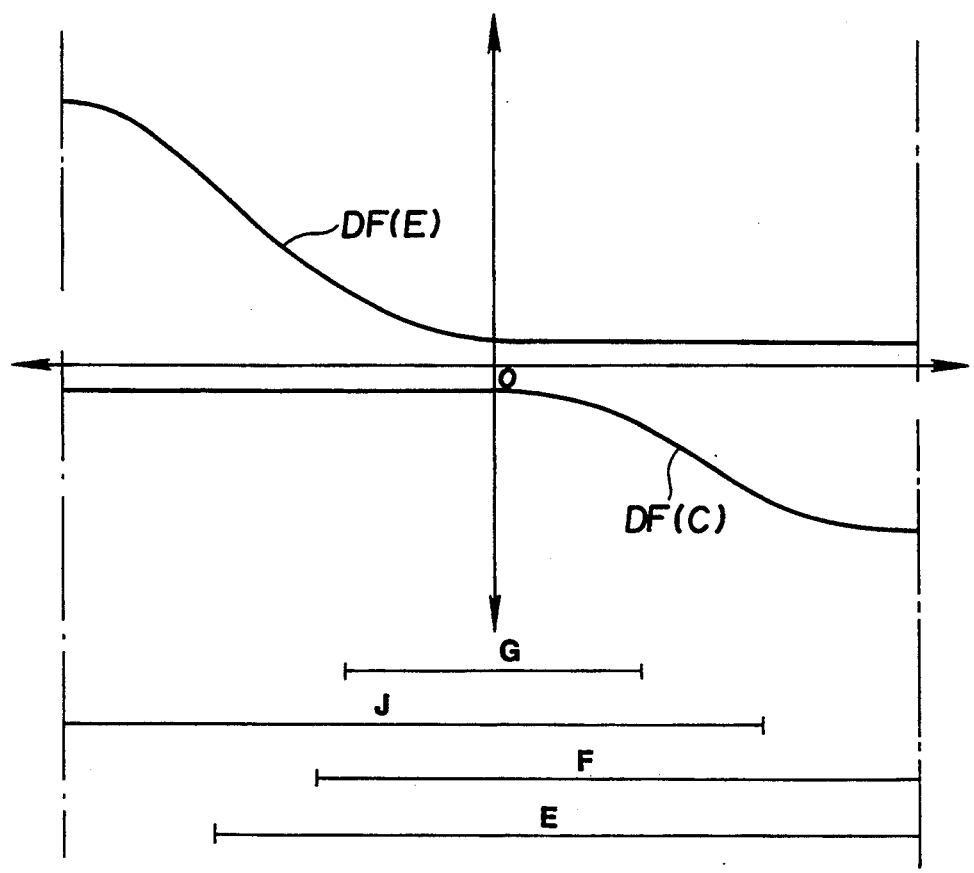
FIG. 18 is a diagrammatic graphical representation of the variation of damping force versus angular displacement of the control rod assembly with the same piston speed together with a bar graph, at the bottom, showing opening ranges of respective passage ways in relation to angular position of the control rod assembly.

If, with a soft contraction phase maintained, a hard extension phase is desired, the hollow control rod 34 is rotated counterclockwise from the neutral position as shown in FIGS. 10 to 12 to a first angularly displaced position as shown in FIGS. 7 to 9. In this first angularly displaced position, the bypass passage way G and the extension phase passage ways E and F are closed although the contraction phase passage way J remains open. At the left-hand half of FIG. 18, there is shown variation of a damping force DF (E) for extension phase and a damping force DF (C) for contraction phase in relation to various angular positions from the neutral position to the first angularly displaced position. Since the contraction phase passage way J is left open, the damping force DF (C) for contraction phase is kept low. As shown in FIG. 18, the damping force DF (E) for extension phase gradually increases owing to this counterclockwise motion from the neutral position toward the first angularly displaced position.

Figure 13:
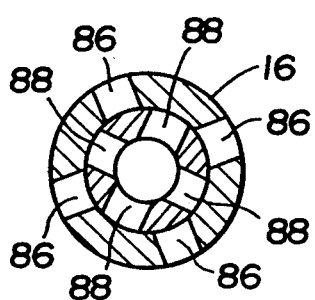
FIGS. 13, 14 and 15 are similar views to FIGS. 7, 8 and 9, but showing the control rod assembly in a second angularly displaced position.
Figure 14:
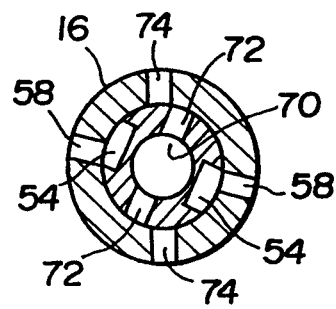
Figure 15:
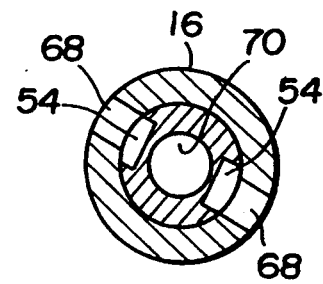

If, with a soft extension phase maintained, a hard contraction phase is desired, the hollow control rod 34 is rotated clockwise from the neutral position as shown in FIGS. 10 to 12 to a second angularly displaced position as shown in FIGS. 13 to 15. In this second angularly displaced position, the bypass passage way G and the contraction phase passage way J are closed although the extension phase passage way E and F remain open. At the right-hand half of FIG. 18, there is shown variation of the damping force DF (E) for extension phase and the damping force DF (C) for contraction phase in relation to various angular positions from the neutral position to the second angularly displaced position. Since the extension phase passage ways E and F are left open, the damping force DF (E) for extension phase is kept low. As shown in FIG. 18, the damping force DF (C) for contraction phase gradually increases owing to this clockwise motion from the neutral position to the second angularly displaced position.

Figure 16:
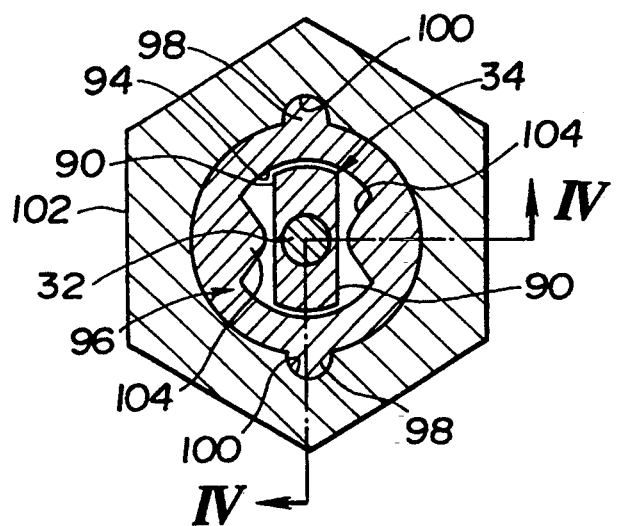
FIG. 16 is a section taken through the line XIII—XIII of FIG. 4.
Figure 17:
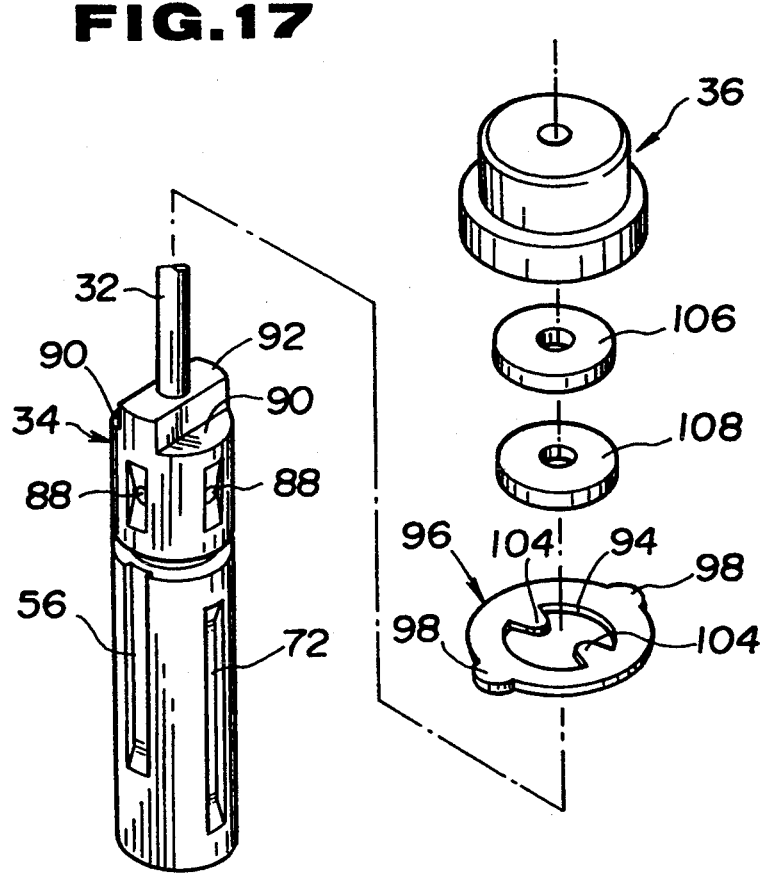
FIG. 17 is an exploded view of a portion of the control rod assembly.

Referring to FIGS. 4, 16 and 17, the hollow control rod 34 has an upper end portion formed with two cutouts 90 to provide a diametrical land 92 with two parallel walls. The diametrical land 92 is received in a key opening 94 of a positioning plate 96. The positioning plate 96 has two diametrically opposed projections 98 received in the corresponding two grooves 100 of an upper stud portion 102 of the hollow rod 16. The positioning plate 96 has inwardly projecting stoppers 104 which abut the diametrical land 92 to limit angular motion of the hollow control rod 34. The positioning plate 96 is interposed between the bushing 36 and the stud portion 102 of the hollow control rod 16. For smooth motion and axial positioning of the hollow control rod 34 within the cylindrical interior of the hollow rod 16, two kinds thrust washers 106 and 108 are disposed between the bushing 36 and the top end of the diametrical land 92 and the bushing 38 supports the lower end of the hollow control rod 34. The use of the positioning plate 96 and the diametrical land 92 assures easy positioning of the hollow control rod 34 without exterting any bending stress on the hollow control rod 34.

In assembly, after mounting the control rod assembly 32, 34 within the piston rod assembly 12, 14, 16, the piston assembly is mounted in the following manner. The valve body 82, the contraction phase one-way valve 30, a washer 110, a collar 112, a washer 114, the contraction phase damping valve 26, the piston 18, the extension phase 24, a washer 116, the valve body 64, the extension phase one-way valve 28, a washer 118 and a collar 120 are mounted around the hollow rod 16 and fixedly secured thereon by tightening a nut 122.

Figure 19:
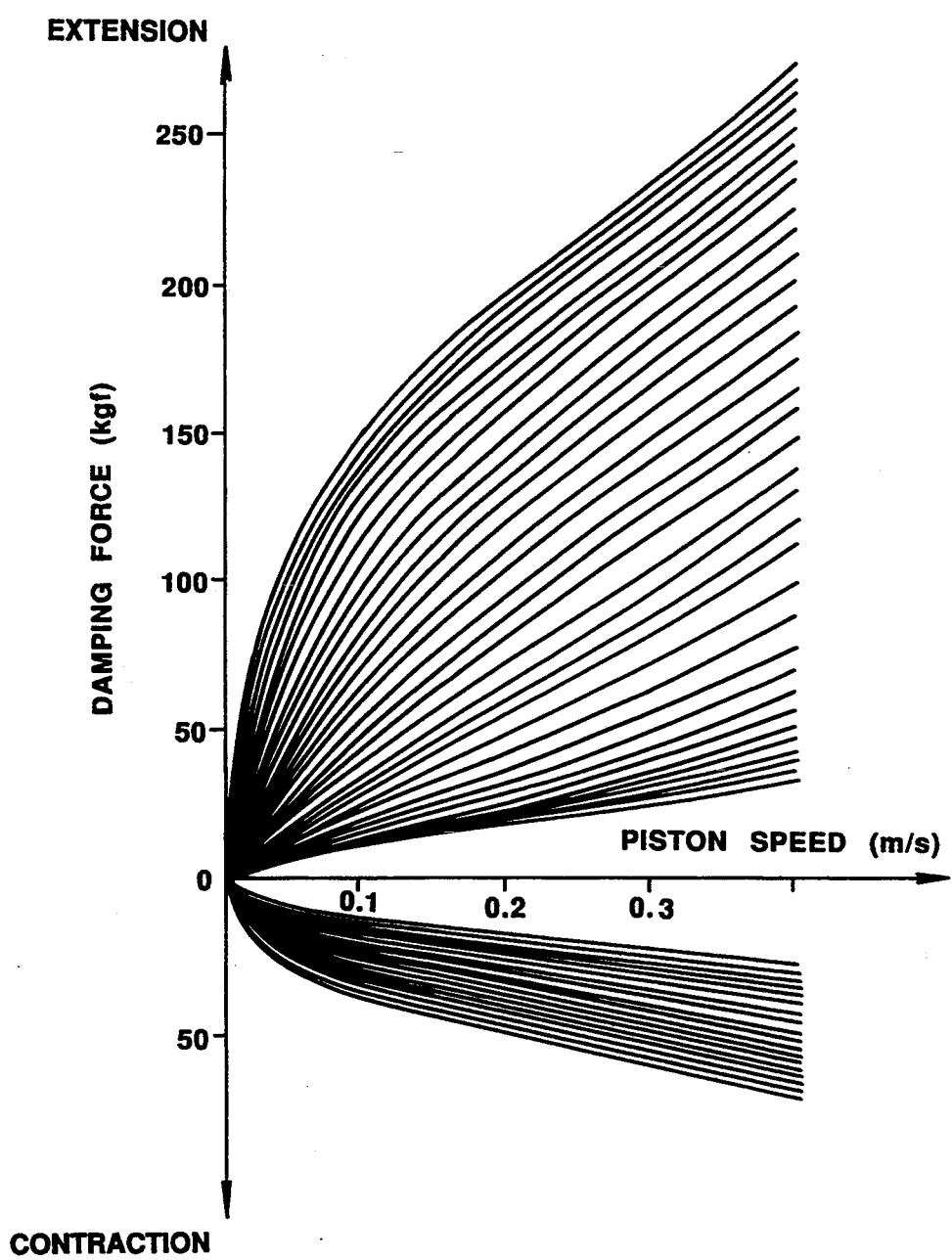
FIG. 19 shows various damping force versus piston speed characterisitics of the hydraulic damper.

As shown in FIG. 19, the adjustable hydraulic damper can provide a number of different damping force versus piston speed characteristics corresponding depending upon different angularly displaced positions of the valve element or the hollow control rod 34 (see FIG. 4).

Figure 20:
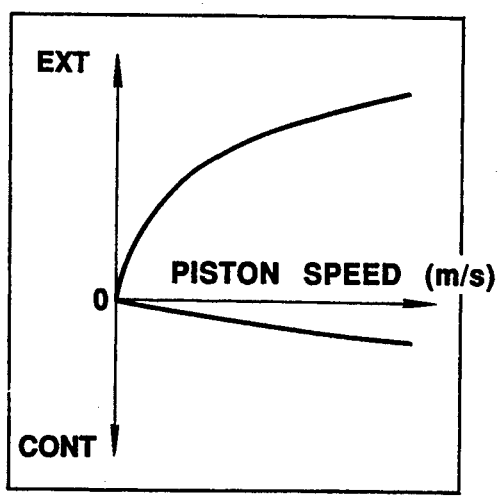
FIG. 20 shows damping force versus piston speed characteristic curves at the first angularly displaced position through counterclockwise rotation of the actuator from the neutral position.

FIG. 20 shows damping force versus piston speed characteristic curves at the first angularly displaced position through counterclockwise rotation of the pulse motor 152 from the neutral position.

Figure 21:
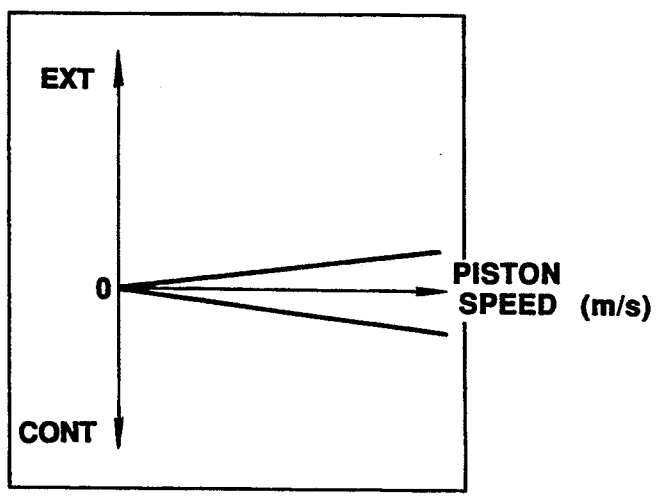
FIG. 21 shows damping force versus piston speed characteristics curves at the neutral position.

FIG. 21 shows damping force versus piston speed characteristic curves at the neutral position.

Figure 22:
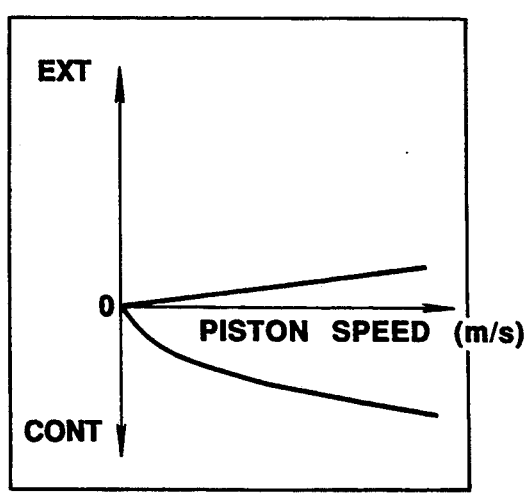
FIG. 22 shows damping force versus piston speed characteristic curves at the second angularly displaced position through clockwise rotation of the actuator from the neutral position.

FIG. 22 shows damping force versus piston speed characteristic curves at the second angularly displaced position through clockwise rotation of the pulse motor 152 from the neutral position.

Figure 24A:
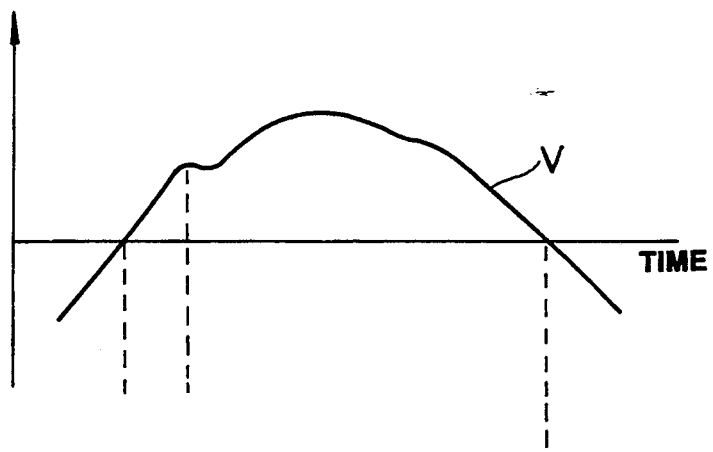
FIGS. 24A, 24B, 24C and 24D are timing charts showing a vertical relative speed indicative signal in FIG. 24A, a target position indicative signal (TARGET in FIG. 23) in FIG. 24B, a present position indicative signal (OUTPUT in FIG. 23), and an actuator position indicative signal in FIG. 24D.
Figure 24B:
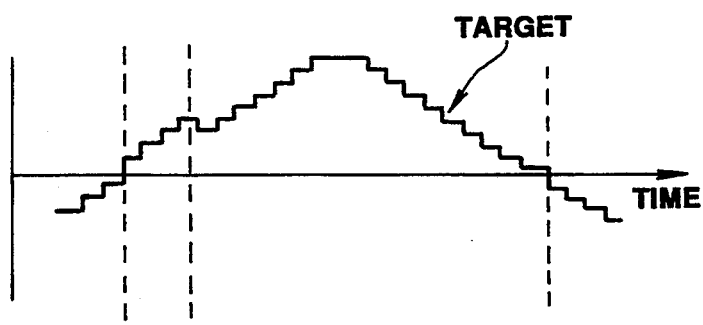
Figure 24C:
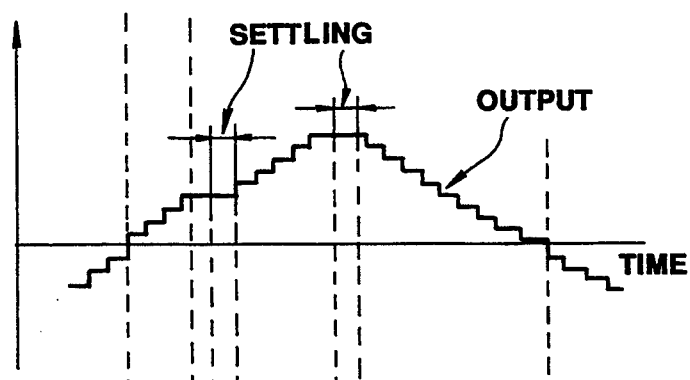
Figure 24D:
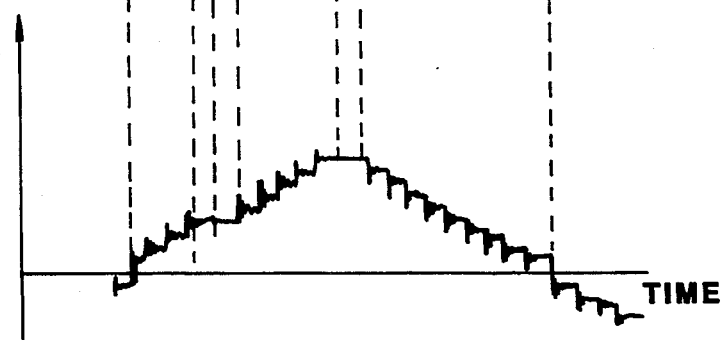

Referring to FIGS. 2, 24A and 24B, the control unit 154 is further explained. In the control unit 154, the vertical speed is derived from the sensor output of the G sensor 150 via integration process. FIG. 24A shows one example of variation of a signal V indicative of the vertical speed with respect to time. There is determined a target position which the pulse motor 152 should take for the shock absorber SA to exibit the most appropriate damping characteristic to the instant value of the vertical speed indicative signal. FIG. 24B shows the variation of a signal TARGET indicative of the determined target position with respect to time. The manner of determining the target position is such that when the vertical speed indicative signal V indicates that the instant speed is directed upward, with the extension phase damping characteristic set hard, the damping characteristic for the extension phase is varied stepwisely in accordance with the magnitude of the vertical speed signal V, while when the instant vertical speed indicative signal V indicates that the instant speed is directed downward, with the contraction phase damping characteristic set hard, the damping characteristic for the contraction phase is varied stepwisely in accordance with the magnitude of the vertical speed indicative signal V. The determined target position (TARGET) is compared with a present position (OUTPUT). In response to result of this comparison, it is determined which direction the pulse motor 152 should turn. Specifically, it is determined whether the pulse motor 152 should turn clockwise (step-up) or counterclockwise (step-down) until the present position (OUTPUT) becomes equal to the target position (TARGET). FIG. 24C shows how the present position OUTPUT varies with respect to time. FIG. 24D shows how actual position of the pulse motor 152 varies with respect to time.

Figure 23:
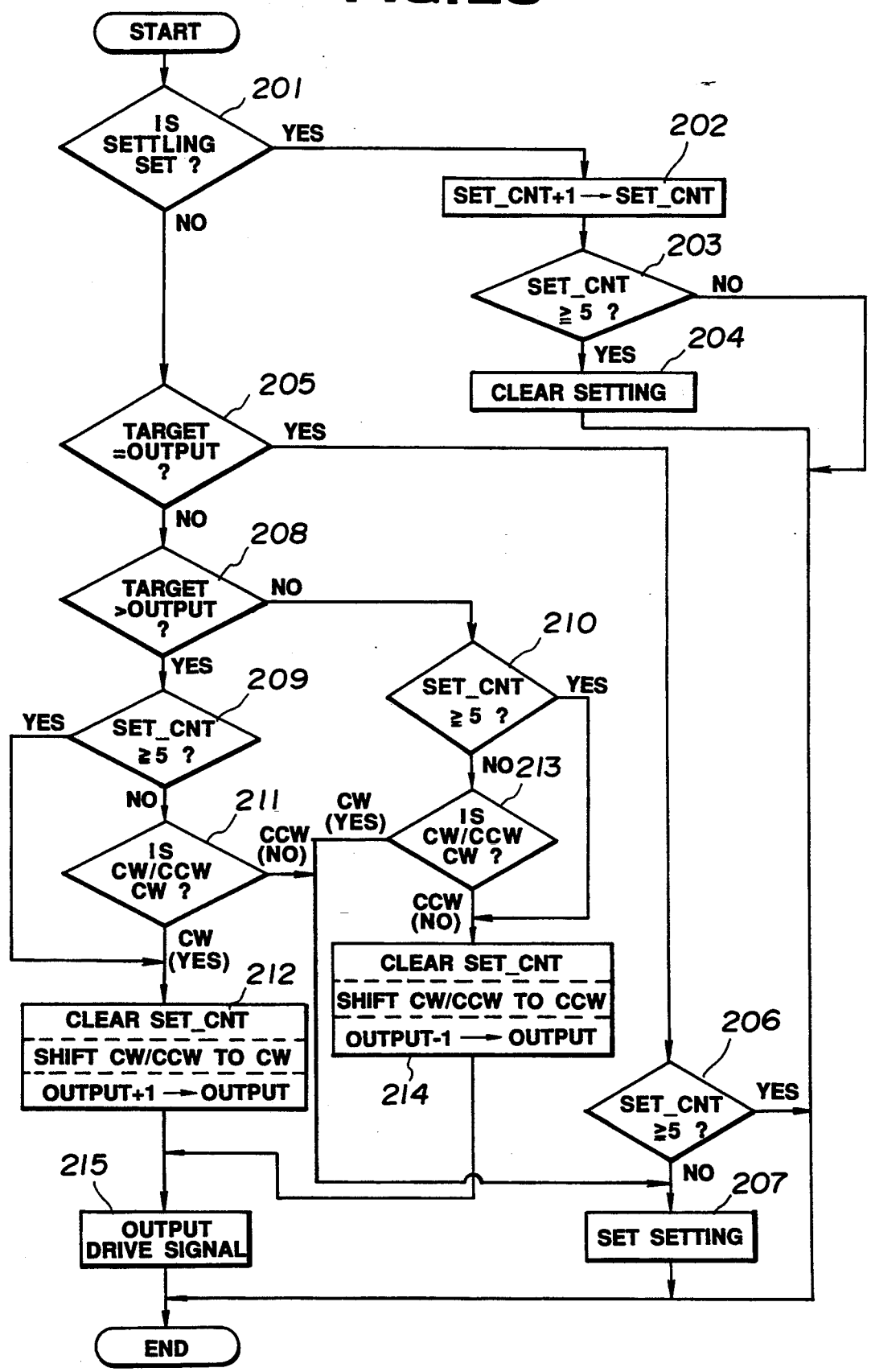
FIG. 23 is a flow diagram of a actuator drive routine.

Referring to FIG. 23, an actuator drive routine is explained. Execution of this routine is repeated and initiated upon elapse of one-cycle time of 0.1 msec.

In FIG. 23, at a step 201, there is an interrogation whether a flag SETTLING is set or not. If this is the case (YES), the flow proceeds to a step 202. If this interrogation results in a negative (NO), the flow proceeds to a step 205. At the step 202, an increment of a counter SET CNT is carried out, viz., the counter SET_CNT is increased by one (1). Then, the flow proceeds to a step 203 where there is an interrogation whether the content of the counter SET_CNT is greater than or equal to five (5) or not. If this is the case (YES), the flow proceeds to a step 204. If the interrogation at the step 203 results in a negative (NO), the flow comes to an end. At the step 204, the SETTLING flag is cleared. After this step 204, the flow comes to an end.

If the interrogation at the step 201 results in a negative (NO), the flow proceeds to the step 205. At the step 205, there is an interrogation whether the present position OUTPUT is equal to the target position TARGET or not. If this is the case (YES), the flow proceeds to a step 206. If the interrogation at the step 205 results in a negative (NO), the flow proceeds to a step 208. At the step 206, there is an interrogation whether the content of the counter SET_CNT is greater than or equal to five (5) or not. If this is the case (YES), the flow comes to an end. If the interrogation at the step 206 results in a negative (NO), the flow proceeds to a step 207. At the step 207, the content of the counter SET CNT is cleared and then the flow comes to an end.

If the interrogation at the step 205 results in a negative (NO), there is an interrogation at the step 208 whether the present position OUTPUT is smaller than the target position TARGET. If this is the case (YES), viz., in the case where the pulse motor 152 should turn clockwise (step-up) to reach the target position TARGET, the flow proceeds to a step 209. If the interrogation at the step 208 results in a nagative, viz., in the case where the pulse motor 152 should turn counterclockwise (step-down) to reach the target position TARGET, the flow proceeds to a step 210.

At the step 209, there is an interrogation whether the content of the counter SET_CNT is greater than or equal to five (5) or not. If this is the case (YES), the flow proceeds to a step 212. If the result of the interrogation at the step 209 is negative, the flow proceeds to a step 211.

A flag CW/CCW (clockwise or counterclockwise) switches between a CW state and a CCW state. The status of the CW/CCW flag is indicative of the direction in which the pulse motor 3 turned previously. The CW state corresponds to previous clockwise rotation of the pulse motor 152, while the CCW state corresponds to previous counterclockwise rotation. At the step 211, there is an interrogation whether the CW/CCW flag has been set to a CW state or a CCW state. If the interrogation at the step 211 indicates that the CW/CCW flag has been set to the CW state, the flow proceeds to a step 212, while if it indicates that the CW/CCW flag has been set to the CCW state, the flow proceeds to a step 207.

At the step 212, the content of the counter SET_CNT is cleared, the CW/CCW flag is set to the CW state, the present position OUTPUT is increased by one (1). After this step 212, the flow proceeds to a step 215.

At the step 210, there is an interogation whether the content of the counter SET_CNT is greater than or equal to five (5) or not. If this is the case (YES), the flow proceeds to a step 214. If the interrogation at the step 214 results in a negative (NO), the flow proceeds to a step 213. At step 213, there is an interrogation whether the CW/CCW flag has been set to the CW state or CCW state. If the interrogation at the step 213 indicates that CW/CCW flag has been set to the CW position, flow proceeds to the step 207, while if it indicates that CW/CCW flag has been set to the CCW position, the flow proceeds to the step 214.

At the step 214, content of the counter SET_CNT is cleared, the CW/CCW flag is set to the CCW position, the present position OUTPUT is decreased by one (1). After this step 214, the flow proceeds to the step 215.

At the step 215, a drive signal is outputted instructing a step-up in response to the increment of the present position OUTPUT or a drive signal instructing a step-down in response to decrement of the present position OUTPUT. The drive signal is supplied to the drive circuit 160 (see FIG. 2). After this step 215, the flow come to an end.

Upon receiving the step-up indicative drive signal, the drive circuit 160 causes the pulse motor 152 to turn clockwise by one step. Upon receiving the step-down indicative drive signal, the drive circuit 160 causes the pulse motor 152 to turn counterclockwise by one step.

From the previous description, it is clear that SETTLING flag is set when it is determined that the pulse motor 152 must invert (viz., reverse) its direction of motion (see a flow along step 208, 209, 211 and 207, or a flow along step 208, 210, 213 and 207) or when the present position OUTPUT is equal to the target position TARGET (see a flow along step 205, 206 and 207). After the SETTLING flag has been set, execution of a flow along step 201, 202 and 203 is repeated until the content of the counter SET_CNT becomes equal to five (5), see steps 202 and 203. In other words, activation the pulse motor 152 is suspended for a predetermined period of time, i.e., 0.5 msec., as long as 5 cycle periods. This process is referred to as a settling process. The predetermined period of time is referred to as a settling time. The length of this settling time is determined based on the attenuation factor of the resonance inducing vibration. Upon elapse of the settling time, the pulse motor 152 is ready to turn to reach the available target position TARGET (see a flow along step 208, 209 202 and 215 and a flow along step 208, 210, 214 and 215). It is to be noted that since the content of the counter SET_CNT is five (5) immediately after elapse of the settling time, the interrogation at the step 211 or 213 is skipped and thus not made.

It will now be appreciated that during the settling time, the resonance inducing vibration is attenuated and thus the pulse motor 152 starts to turn after the resonance vibration has decreased sufficiently. Thus, the loss of synchronism of the pulse motor 152 can be avoided.

Referring again to FIGS. 24A, 24B, 24C and 24D, it will be recognized that owing to the settling time, the pulse motor 152 moves smoothly with any loss of synchronism.

What is claimed is:

1. A control system for a vehicular suspension for a vehicle body, comprising:
   a hydraulic damper connected to support the vehicle body, said damper including a valve element having a plurality of positions and a stepper motor drivingly coupled with said valve element;
   sensor means for detecting vertical acceleration of the vehicle body and generating a sensor output signal indicative of the detected vertical acceleration; and
   control means connected with said stepper motor and said sensor means for repeating execution of a control routine wherein said control means determines a target position value indicative of an optimum position of said stepper motor in response to said sensor output signal, compares said target position value with an actual position value indicative of the position in which said stepper motor is currently positioned, and moves said stepper motor in response to a result of the comparison such that said control means moves said stepper motor in one direction when the actual position value is less than the target position value, and moves said stepper motor in the opposite direction when the actual position value is greater than the target position value;

wherein said control means determines which direction said stepper motor should move after comparing the actual position value with the target position value;

wherein said control means determines whether or not the determined direction is the same as the direction of an immediately previous motion of said stepper motor; and wherein said control means suspends execution of said control routine and holds said stepper motor stationary for a predetermined period of time after said control means has determined that the determined direction is not the same as the direction of the immediately previous motion of said stepper motor.

2. The control system as claimed in claim 1, wherein said control means resumes execution of said control routine after an elapse of said predetermined period of time.

3. The control system as claimed in claim 1, wherein said control means suspends execution of said control routine when said control means determines that the actual position value is the same as the target position value.

4. The control system as claimed in claim 3, wherein said control means resumes execution of said control routine after an elapse of said predetermined period of time.

5. A control system for a vehicular suspension for a vehicular body, comprising:

a hydraulic damper connected to support the vehicle body, said damper including a valve element having a plurality of positions and a stepper motor drivingly coupled with said valve element;

sensor means for detecting vertical acceleration of the vehicle body and generating a sensor output signal indicative of the detected vertical acceleration; and control means connected with said stepper motor and said sensor means for:
  repeating execution of a control routine wherein said control means determines a target position value representative of an optimum position of said stepper motor in accordance with said sensor output signal, comparing said target position value with an actual position value representative of the actual position of said stepper motor, and moving said stepper motor in response to a result of a comparison of said target position value and said actual position value such that said control means moves said stepper motor in one direction when the actual position value is less than the target position value, and moves said stepper motor in the opposite direction when the actual position value is greater than the target position value;

wherein said control means includes a settling flag means, a settling counter and a direction flag means, said direction flag means being settable to a first state indicative of a first direction of motion of said stepper motor and to a second state indicative of a second direction, opposite to said first direction, of motion of said stepper motor;

wherein said control means repeats incrementation of said settling counter when said settling flag means is set until said settling counter reaches a predetermined value, and clears said settling flag means upon said settling counter reaching said predetermined value;

wherein said control means repeats execution of said control routine when said settling flag is cleared;

wherein said control means sets said settling flag when said settling counter is less than said predetermined value and the actual position value is equal to the target position value;

wherein said control means sets said direction flag to said first state, clears said settling counter and moves said stepper motor in said first direction, when said settling counter is equal to said predetermined value and the actual position value is less than the target position value, and said control means sets said direction flag to said second state, clears said settling counter and moves said stepper motor in said second direction when said settling counter is equal to said predetermined value and the actual position value is greater than said target position value;

wherein said control means determines whether said direction flag is set to said first state or to said second state when said settling counter is less than said predetermined value;

wherein said control means sets said settling flag when said direction flag is set to said second state and the actual position value is less than the target position value; and wherein said control means sets said settling flag when said direction flag is set to said first state and the actual position value is greater than the target position value.

* * * * *